United States Patent [19]

Penney

[11] 4,351,648
[45] Sep. 28, 1982

[54] ELECTROSTATIC PRECIPITATOR HAVING DUAL POLARITY IONIZING CELL

[75] Inventor: Gaylord W. Penney, Pittsburgh, Pa.

[73] Assignee: United Air Specialists, Inc., Cincinnati, Ohio

[21] Appl. No.: 77,891

[22] Filed: Sep. 24, 1979

[51] Int. Cl.³ .......................... B03C 3/12; B03C 3/38
[52] U.S. Cl. ...................................... 55/137; 55/138; 55/143; 55/150
[58] Field of Search ................................ 55/136–138, 55/143, 150

[56] References Cited

U.S. PATENT DOCUMENTS

| | | | |
|---|---|---|---|
| 2,997,130 | 8/1961 | Nodolf | 55/143 X |
| 3,980,455 | 9/1976 | Masuda | 55/138 X |
| 3,988,131 | 10/1976 | Kanazawa et al. | 55/138 X |

*Primary Examiner*—Kathleen J. Prunner
*Attorney, Agent, or Firm*—Frost & Jacobs

[57] ABSTRACT

An electrostatic precipitator air cleaner having a novel ionizer cell made up of a plurality of positively charged wire-like ionizer electrodes, a plate-like negatively charged passive electrode positioned between and parallel to each adjacent pair of ionizer electrodes, and a box-like enclosure surrounding the ionizer cell such that the side walls of the enclosure adjacent the outermost ones of the ionizer electrodes form grounded electrically conducting surfaces, a relatively high electrostatic field being produced in the region between the ionizer electrodes and the passive electrodes and between the ionizer electrode and the grounded surfaces. In a preferred embodiment, the ionizer electrodes and passive electrodes are impressed with relatively high voltages of equal but opposite polarity such that the spacing between an ionizer electrode and an adjacent passive electrode is twice the spacing between an ionizer electrode and the adjacent grounded surface.

4 Claims, 6 Drawing Figures

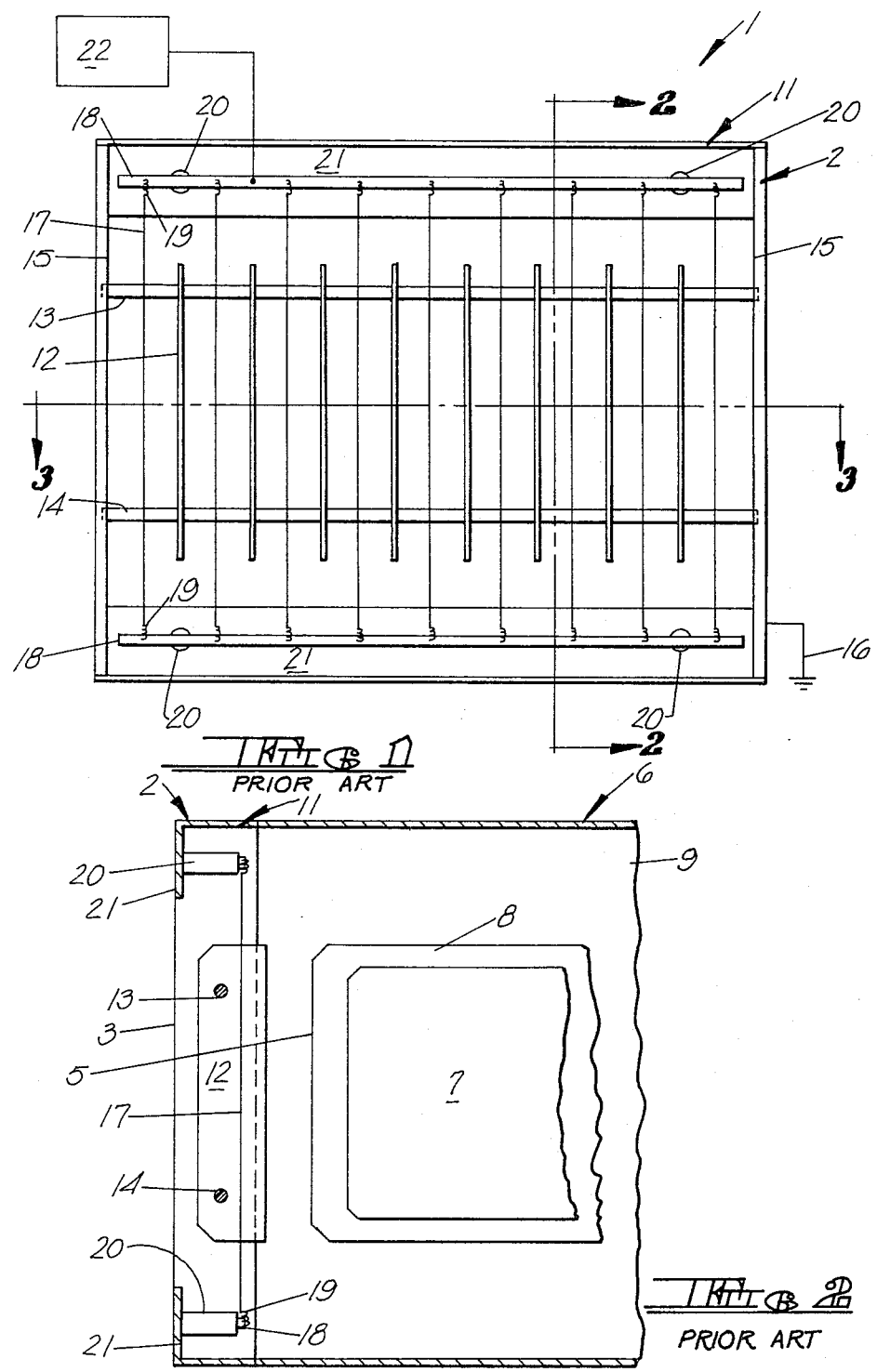

ELECTROSTATIC PRECIPITATOR HAVING DUAL POLARITY IONIZING CELL

SUMMARY OF THE INVENTION

The present invention relates generally to improvements in a two stage electrostatic precipitator air cleaner for removing airborne particulate material. The operation of such conventional two stage electrostatic precipitator air cleaners is well known, and only need be briefly described. In general, airborne dirt and dust particles entering the cleaner under the influence of a blower or other air moving apparatus, are charged to a relatively high positive potential by means of an ionizer cell containing a plurality of spaced ionizer electrodes. The positively charged particles are then directed to a collecting cell of the air cleaner which is made up of a number of alternating grounded and positively charged collecting plates. The positively charged airborne particles are repelled by the positively charged plates, and collected on the grounding plates, where they may later be removed by rapping, washing or the like as is well understood in the art.

The conventional ionizer cell contains a number of parallel spaced wire-like ionizer electrodes oriented transversely to the incoming particle-laden airflow which are separated by relatively narrow parallel spaced grounded passive electrodes. The electrostatic field formed between the charged wire-like electrodes and the grounded passive electrodes charge the airborne particles as noted hereinabove. In the usual type of construction, the spaced passive electrodes are supported from each other, and from the electrostatic precipitator air cleaner casing by conductive rods or spacers, which places the air cleaner casing at ground potential. This type of configuration facilitates attaching the air cleaner to grounded duct work and eliminates shock hazards for personnel operating near the air cleaners.

It has been proposed to increase the collecting efficiency of such air cleaners by increasing the voltage potentials impressed on the ionizer electrodes in order to produce a higher electrostatic field for charging the airborne particles. One important electrostatic precipitator design parameter is corona current per unit length of ionizer electrode. For any given geometrical shape of the ionizer electrode, such as cylindrical, for example, this current per unit length determines the electric field and ion density. Provided the air velocity through the ionizer cell of the precipitator is held constant, the resulting electric field strength and ion density determine the charge per particle. Consequently, by increasing the current per unit length of ionizer electrode, the particle charge may also be increased. However, it has generally been found that for a particular charged ionizer electrode to grounded passive electrode spacing, the ionizer voltage can only be increased to a certain point before breakdown or sparkover in the region between the electrodes occurs causing corona and sparking which can create a fire hazard and excess ozone production. A potential of 30,000 volts/cm has often been quoted as a typical breakdown voltage for uniform clean electrodes, although only 3,000 volts/cm is typically obtainable in practice. Consequently, there is some limiting current at which the corona becomes erratic so that sparkover occurs.

Since it has been found that all of the ozone is produced at the ionizer electrode wire, increasing the impressed ionizer voltage as well as the ionizer electrode to passive electrode spacing permits more air to flow for the same amount of ozone produced. Usually, when the spacing of the charged and grounded ionizer electrodes is increased, the ionizer electrode wire diameter can also be increased resulting in a more rugged construction. Consequently, this also increases the collecting efficiency of the air cleaner since higher electrostatic fields are produced for charging the airborne particles.

Unfortunately, it has generally been found that power supplies necessary to produce high single polarity positive voltages for producing an increased electrostatic field between the ionizer electrode and the grounded passive electrode are impractical from a cost and complexity standpoint. However, I have found that the necessary increased electrostatic field strength can be produced by impressing the ionizer electrodes with a conventional high voltage positive potential, and impressing the passive electrodes with a high voltage negative potential, rather than referencing the passive electrodes to ground as in conventional electrostatic precipitator air cleaners. This construction permits the use of simple, low cost conventional high voltage power supplies, and avoids other problems which may occur when very large single polarity voltages are used.

Using this technique, the electrostatic precipitator air cleaner of the present invention provides improved operation and performance over known electrostatic precipitators using single polarity ionizer power supplies. Furthermore, in a preferred embodiment, the outermost or end passive electrodes, which may form a part of the air cleaner casing, are electrically grounded and insulated from the negatively charged passive electrodes to insure a safe, potential-free enclosure surrounding the air cleaner. The outermost ionizer wire electrodes which are charged to a relatively high positive DC potential, are spaced the conventional distance from the grounded end plates, such that the usual electrostatic field is produced in this region. The adjacent passive electrode, however, is charged to a relatively high negative DC potential, and is spaced from the ionizer wire by twice the usual distance to produce substantially the same voltage gradient between the charged passive electrode and the ionizer wire that exists in conventional electrostatic precipitator air cleaners between the ionizer wire and the grounded passive electrode. For example, in the preferred embodiment illustrated and described, where the ionizer wire electrodes and the passive electrodes are impressed with voltage potentials of the same magnitude but opposite polarities, the distance between the charged collecting plates and the ionizer wires will be twice the distance measured between an ionizer wire and a grounded passive electrode or end plate. This arrangement results in a construction where only charged passive electrodes are utilized in the interior of the ionizing cell, resulting in substantially the same voltage gradient being produced as in conventional electrostatic precipitator ionizer cells, but with significant savings in materials and simplification of construction.

Further details of the invention will become apparent from the detailed description which follows.

BRIEF DESCRIPTION OF THE DRAWING

FIG. 1 is a rear view, partially in schematic form, of a typical prior art electrostatic precipitator air cleaner illustrating the outlet end of the ionizer cell.

FIG. 2 is a fragmentary cross sectional view taken along section line 2—2 of FIG. 1.

DETAILED DESCRIPTION

Figure 3:
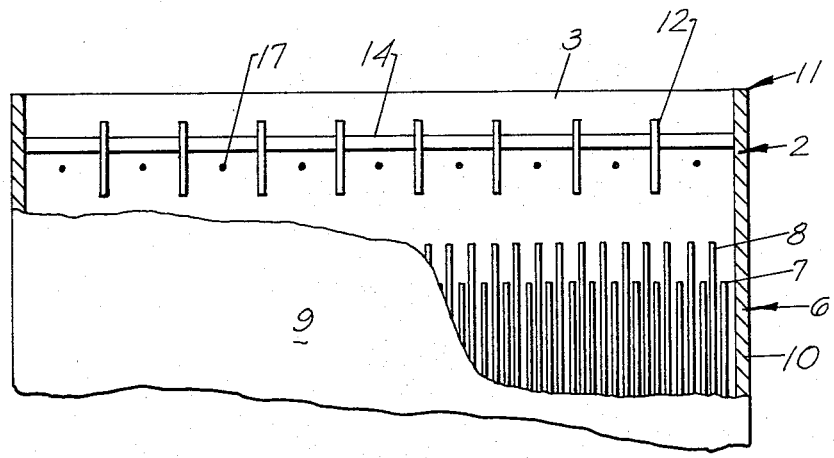
FIG. 3 is a fragmentary cross sectional view, partially cut away, taken along section line 3—3 of FIG. 1.

FIG. 1–FIG. 3 illustrate a typical prior art electrostatic precipitator air cleaner, shown generally at 1 which includes an ionizer cell 2 having an inlet end 3 for accepting particle laden air, and an outlet 4 which communicates with the inlet end 5 of a collecting cell 6. In general, airborne dirt and dust particles contained in the airstream moved through the precipitator by air moving means (not shown) are charged in ionizer cell 2 to a relatively high positive potential. The positively charged particles are then directed to the collecting cell 6 of the air cleaner 1 where the particles are collected on collecting plates for subsequent removal by cleaning means such as a rapper or washing mechanism (not shown).

In the conventional electrostatic precipitator air cleaner 1, collecting cell 6 comprises a plurality of parallel spaced collecting electrodes, one of which is shown at 7, interleaved with parallel spaced grounded collecting electrodes, one of which is shown at 8. The positively charged particles passing through collecting cell 6 are repelled by positively charged plates 7 and collected on grounded collecting plates 8. Collecting cell 6 may be contained within a box-like electrically conducting enclosure 9 which may also be grounded to facilitate connection to an air duct or the like (not shown). Furthermore, the side walls 10 of enclosure 9 may form a pair of grounded collecting electrodes.

The ionizer cell 2 of the conventional electrostatic precipitator air cleaner 1 comprises a box-like enclosure 11 which is adapted to mate with the front edge of collecting cell 6 to form a continuous duct-like air passageway through the air cleaner. Contained within enclosure 11 are a number of narrow parallel spaced electrically conducting passive electrodes, one of which is shown at 12, which are electrically connected and supported near their top and bottom edges by electrically conducting rod-like spacing members 13 and 14. The ends of spacing members 13 and 14 are supported by and electrically connected to end plates 15 of enclosure 11, which may be grounded as at 16, thereby placing all of passive electrodes 12, as well as enclosure 11, at ground potential. This arrangement facilitates attaching the ionizer cell enclosure 11 to enclosure 9 of collecting cell 6, as well as to other grounded air ducts, not shown.

The ionizing electrodes are formed by a plurality of parallel spaced thin electrically conducting wires, one of which is shown at 17, interleaved between adjacent passive electrodes 12. The ends of each ionizer wire 17 are connected to parallel spaced transversely extending electrically conducting support bars 18 by means of tension springs 19 which urge the ends of ionizer electrode wire 17 outwardly to maintain the proper tension. Support bars 18 are electrically insulated from ionizer cell enclosure 11 by means of electrically non-conducting stand-off supports 20 attached between support members 18 and the upper and lower front flanges 21 of enclosure 11.

Electrostatic precipitator 1 also includes a power pack 22 which supplies a relatively high positive DC potential voltage, on the order of 12 KV for a typical air cleaner, to support bars 18 in order to charge ionizer wire electrodes 17. In many instances, the same voltage will be utilized to charge collecting electrodes 7 of collecting cell 6.

It will be observed that in this typical arrangement, only a single polarity power supply is utilized, and the ionizer electrode and passive electrode spacing is constant in ionizer cell 2. Generally, the spacing between the ionizer electrodes 17 and the passive electrodes 12 will be such as to create the maximum voltage gradient while avoiding sparkover conditions. It will further be observed that the enclosure formed by ionizer cell enclosure 11 and collecting cell enclosure 9 is grounded in order to facilitate connecting the air cleaner unit to grounded duct work or the like.

Figure 4:
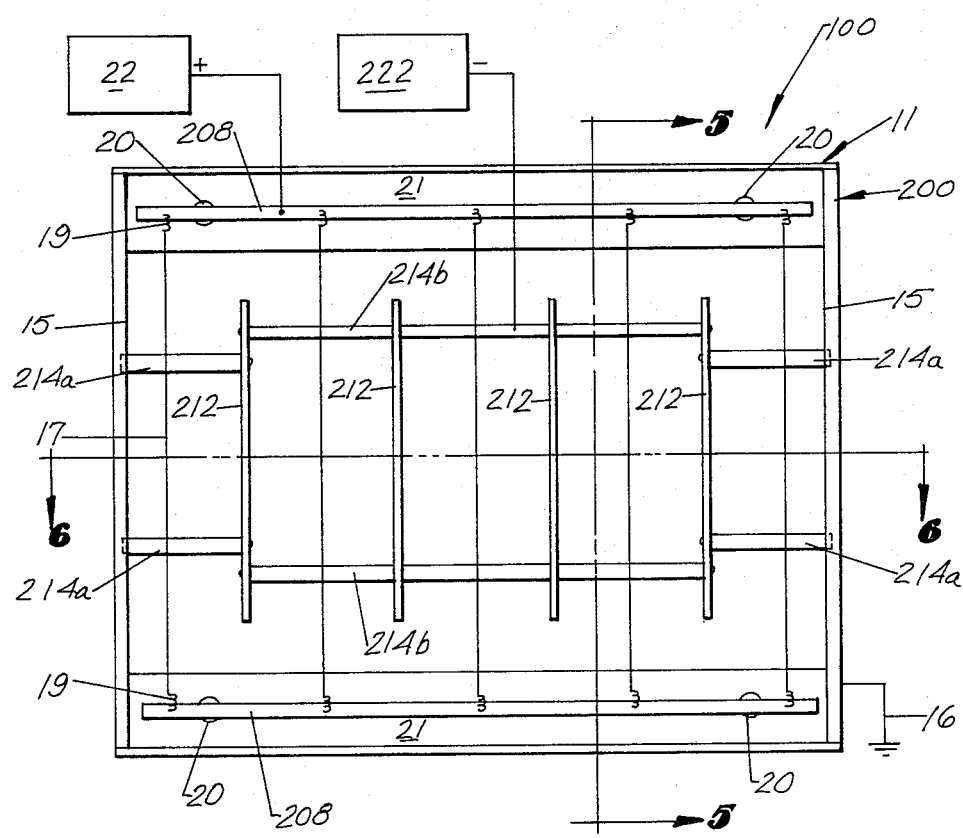
FIG. 4 is a rear elevation view, partially in schematic form, of the electrostatic precipitator air cleaner of the present invention showing the outlet end of the ionizer cell.
Figure 5:
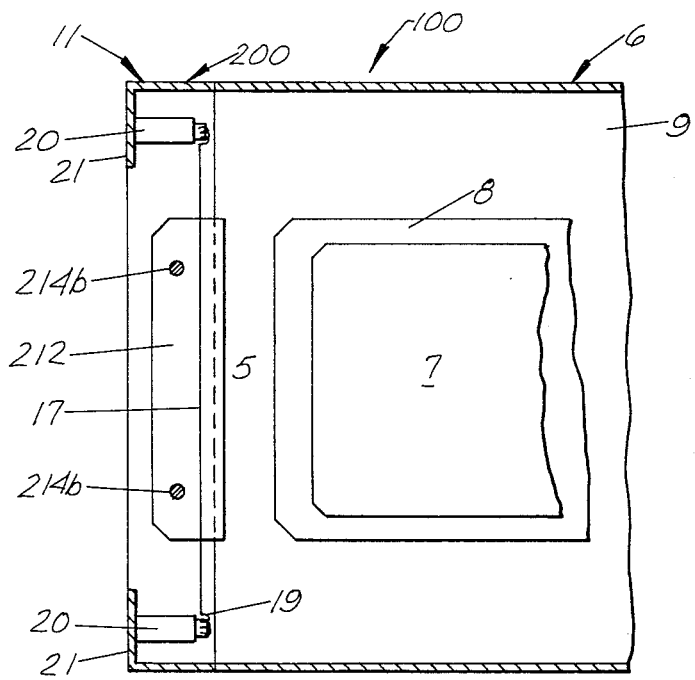
FIG. 5 is a fragmentary cross sectional view taken along section line 5—5 of FIG. 4.
Figure 6:
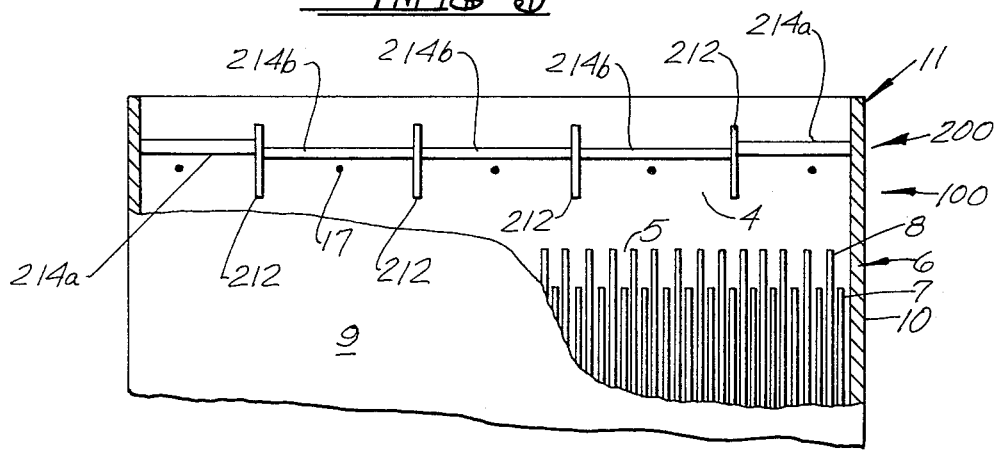
FIG. 6 is a fragmentary cross sectional view, partially cutaway, taken along section line 6—6 of FIG. 4.

The improved electrostatic precipitator air cleaner of the present invention is illustrated generally at 100 in FIG. 4–FIG. 6. In general, elements in the embodiment of FIG. 4–FIG. 6 corresponding to elements in the prior art embodiment described hereinabove will be given the same designation. For example, collecting cell 6 may be constructed in the same manner as described hereinabove, and will include a box-like enclosure 9, generally constructed of an electrically conducting material, having an inlet end 5 for connecting collecting cell 6 to the ionizer cell 200 of the present invention.

As illustrated in FIG. 4–FIG. 6, ionizer cell 200 comprises a generally box-like enclosure 11 similar to that described hereinabove in connection with the embodiment of FIG. 1–FIG. 3, formed by a pair of spaced upstanding plate-like electrically conducting end walls 15, and upper and lower front flange plates 21. Enclosure 11 may be grounded as at 16 to facilitate connecting the ionizer cell to duct work or the like, not shown.

Contained within enclosure 11 are a plurality of parallel spaced narrow passive electrodes, one of which is shown at 212, of roughly the same size, shape and construction of passive electrodes 12 of a conventional electrostatic precipitator air cleaner. The outermost passive electrodes 212 are supported from end plates 15 by a pair of spaced electrically non-conducting spacing members 214a which insure that the outermost passive electrodes 212 are electrically isolated from enclosure 11.

Interspersed between the outermost passive electrodes 212 are a plurality of similarly configured passive electrodes 212 which are positioned in parallel relationship with the outermost passive electrodes, and spaced therefrom by parallel spaced electrically conducting support members 214b, thereby insuring that all passive electrodes 212 will be at the same electrical potential.

As illustrated in FIG. 4, ionizer cell 200 includes a plurality of spaced parallel thin wire-like ionizer electrodes 17 interleaved with passive electrodes 212 and extending between a pair of spaced parallel transversely extending support bars 208 electrically insulated from ionizer cell frame 11 by stand-off insulators 20. Ionizer electrodes 17 are held under the proper tension by means of tension springs 19 as described hereinabove with respect to the embodiment of FIG. 1–FIG. 3. The spacing of passive electrodes 212 and ionizer electrodes 17, which forms an important feature of the present invention, will be explained in more detail hereinafter.

Ionizer wire electrodes 17 are charged to a relatively high positive DC potential by means of positive power supply 22, the output of which is connected to one of support bars 208. Passive electrodes 212 are charged to a relatively high negative DC potential by means of negative power supply 222, the output of which is connected to one of electrically conducting spacing members 214b. If desired, a single power pack having dual voltage outputs may be utilized in lieu of separate power supplies having opposite polarities.

It will be understood that this construction produces an arrangement where relatively high electrostatic fields are produced in the region between end plates 15 and the outermost ionizer wires 17, and the regions between ionizer wire 17 and negatively charged passive electrodes 212. As illustrated in FIG. 4, ionizer wires 17 and negatively charged passive electrodes 212 may be impressed with voltages of the same magnitude, but opposite polarity, for example ±12 KV. Under these conditions, the outermost ionizer wires will be spaced from their associated end plates 15 approximately the same distance as in the conventional electrostatic precipitator 1 illustrated in FIG. 1–FIG. 3 in order to produce the required voltage gradient between these ionizer wires and their associated end plates. In addition, passive electrodes 212 will be spaced from their adjacent ionizer wire electrodes 17 a distance equal to twice the spacing between the associated ionizer wire 17 and a passive electrode 12 in the conventional electrostatic precipitator air cleaner 1. This arrangement insures that the voltage gradient thus produced in the regions between ionizer wire electrode 17 and passive electrodes 212 will be substantially the same as the voltage gradient produced between the outermost ionizer wire electrode 17 and end plates 15, even though the actual potential difference between the ionizer wire 17 and the passive electrodes 212 is twice as great as the potential difference between the outermost ionizer wires 17 and the end plates 15. In other words, the positioning means formed by support bars 208 position each ionizer wire 17 within ionizer cell 200 such that at least one of the ionizer wires is unequally spaced with respect to the adjacent grounded end plate while insuring that the voltage gradients produced between each of the ionizer wires and the adjacent passive electrode are substantially the same. It will be understood that by "unequally spaced" is meant that the ionizer wire 17 is not centered between its adjacent passive electrode 212 and the associated end plate 15.

It will be further understood that one of the important features of the present invention is the positioning of the ionizer wires on support bars 208 such that the voltage gradient between the ionizer wire and the adjacent end plate is substantially the same as the voltage gradient between an ionizer wire and an adjacent charged passive electrode 212. In the preferred embodiment described hereinabove where end plates 15 are electrically grounded, and charged passive electrodes 212 and ionizer wire 17 are impressed with relatively high DC voltage potentials of equal magnitude but opposite polarity, the ionizer wires will be positioned such that the distance between one of the ionizer wires and an adjacent passive electrode is twice the distance measured between an ionizer wire and the adjacent grounded end plate. For example, with end plates 15 grounded, and ±12 KV supplied to the ionizer wires and charged passive electrodes, respectively, and an assumed charged passive electrode to ionizer wire spacing of three inches, a voltage gradient of 8 KV per inch will be produced in the region between the ionizer wire and the adjacent collecting plate. Consequently, in order to produce the same voltage gradient in the region between the ionizer wire and an adjacent grounded end plate 15, a spacing of 1.5 inches will be necessary.

However, the inventive principal described and illustrated in the preferred embodiment hereinabove may be extending to electrostatic precipitator air cleaner constructions utilizing different charging means. For example, the polarities of the charging means or power packs 22 and 222 may be reversed so that a relatively high negative DC voltage is applied to the ionizer wires and a relatively high positive DC voltage is applied to the charged passive electrodes 212. Furthermore, while for purposes of an exemplary showing, the output voltage produced by power packs 22 and 222 have been described as equal and of opposite polarity, these voltages may be made unequal as desired with a corresponding change in the spacing between the outermost ionizer electrodes and end plates 15 such that the same voltage gradient is produced between the outermost ionizer wires and end plates 15 as is produced in the region between the ionizer wires and the adjacent charged passive electrode. For example, in the particular construction described hereinabove where grounded end plates 15 and an assumed ionizer wire to charged passive electrode spacing of three inches are utilized, a positive DC voltage produced by power pack 22 of +12 KV and a negative DC potential of −6 KV produced by power pack 222 will result in a voltage gradient of 6 KV per inch in the region between the ionizer wire and the adjacent charged passive electrode. This situation requires that the ionizer wire be spaced from the adjacent grounded end plate 15 by a distance of two inches.

The electrostatic precipitator 100 of the present invention may be further modified by utilizing charging voltages of only one polarity, such that the voltage applied to ionizer wires 17 is at a greater positive potential than the positive voltage applied to passive electrodes 212. For example, in the case where grounded end plates 15 and an ionizer wire to charged passive electrode spacing of three inches are utilized, with a voltage potential of +12 KV produced by power pack 22 and a voltage potential of +6 KV produced by power pack 222, a voltage gradient of 2 KV per inch will be produced in the region between the ionizer wire and the adjacent passive electrode so that the ionizer wire to end plate spacing will be six inches.

The electrostatic precipitator air cleaner of the present invention may be further modified by charging end plates 15 to a specified voltage so that the end plates also act as charged passive electrodes. In this situation, the passive electrodes and ionizer wires will be equally spaced as in the arrangement shown in FIG. 1–FIG. 3. However, this embodiment may have the drawback that additional insulating means must be utilized when connecting the electrostatic precipitator to an existing grounded air duct or the like.

Finally, it is contemplated to be within the scope of the present invention to charge various ones of the ionizer wires to different voltages, and/or various ones of the charged passive electrodes to different voltages. For example, for a construction where end plates 15 are grounded the outermost ionizer wires 17 are provided with the voltage potential of +12 KV, the inner ionizer wires 17 are provided with a voltage potential of +6 KV, the passive electrodes 212 are provided with a voltage potential of −12 KV, and an ionizer wire to passive electrode spacing of three inches is utilized, all resulting in a voltage gradient in the region between the ionizer wires and the passive electrodes of 6 KV per inch, an ionizer wire to end plate spacing of two inches will be required.

This arrangement leads to several important advantages over known electrostatic precipitator air cleaners. For example, a significant improvement in reducing back ionization is realized which results in lower ionizer currents under conditions of heavily particle coated collector plates. In addition, fewer ionizer wires and passive electrodes are necessary, leading to a reduction in overall material and assembly costs, as well as possible reduction in the required size of the power supply. Since the power requirements have been reduced, a significant energy savings is also realized, and a single power supply can be used to energize several different electrostatic precipitator units.

It will be understood that various changes in the details, materials, steps and arrangements of parts, which have been herein described and illustrated in order to explain the nature of the invention, may be made by those skilled in the art within the principal and scope of the invention as expressed in the appended claims.

Embodiments of the invention in which an exclusive property or privilege is claimed are as follows:

1. A two-stage electrostatic precipitator air cleaner for removing particles from an airstream laden with said particles comprising an ionizer cell for producing a plurality of relatively high electrostatic fields for charging said particles and a collecting cell positioned downstream from said ionizer cell for collecting said particles, said ionizer cell comprising:
   a plurality of thin electrically conductive spaced parallel wire-like ionizer electrodes positioned across the inlet to said ionizer cell;
   means for charging said ionizer electrodes to a first relatively high DC voltage;
   an electrically conducting plate-like passive electrode positioned between and parallel to each adjacent pair of said ionizer electrodes;
   means for charging said passive electrodes to a second relatively high DC voltage such that a relatively high electrostatic field is created between said ionizer electrodes and said passive electrode;
   and a box-like enclosure surrounding said ionizer cell, the side walls of said enclosure adjacent the outermost ones of said ionizer electrodes forming grounded electrically conducting surfaces, a relatively high electrostatic field being produced between the outer ones of said ionizer electrodes and said surfaces.

2. The electrostatic precipitator air cleaner according to claim 1 including means for positioning said ionizer electrodes such that the voltage gradients produced between each of said ionizer electrodes and an adjacent passive electrode and between each of said ionizer electrodes and an adjacent one of said grounded surfaces are substantially the same.

3. The electrostatic precipitator air cleaner according to claim 2 wherein said first and second voltages are the same in magnitude but opposite in polarity, and said positioning means spaces said ionizer electrodes twice the distance from said passive electrodes as from said grounded surfaces.

4. The electrostatic precipitator air cleaner according to claim 3 wherein said first voltage is of positive polarity.

* * * * *